Jan. 6, 1942.     R. D. KILLEBREW     2,268,877
HOSE REEL
Filed Aug. 10, 1939
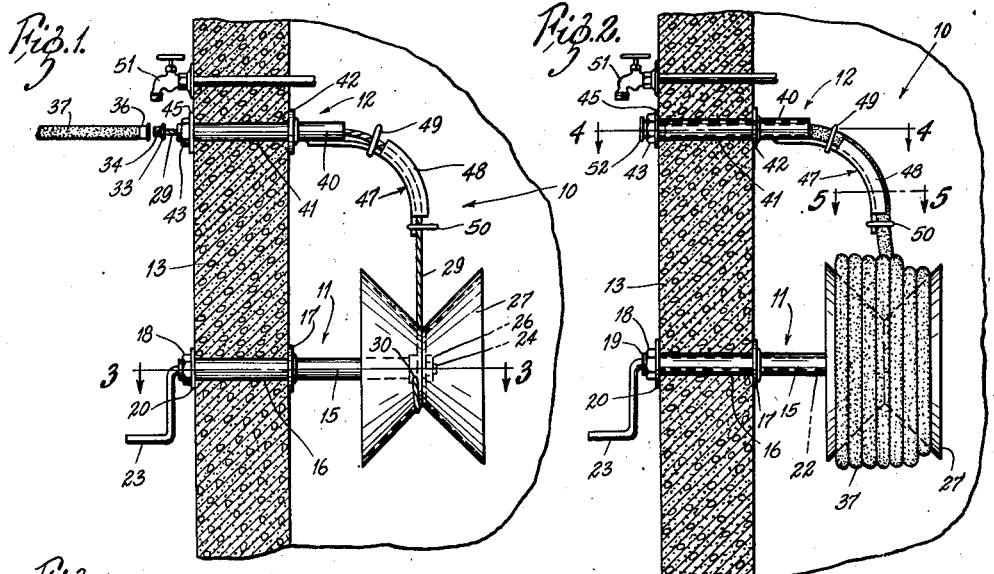
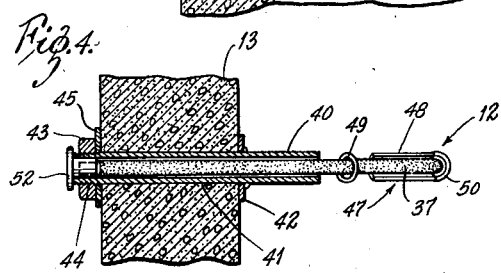
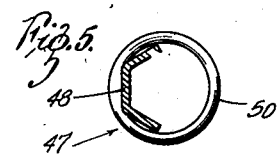
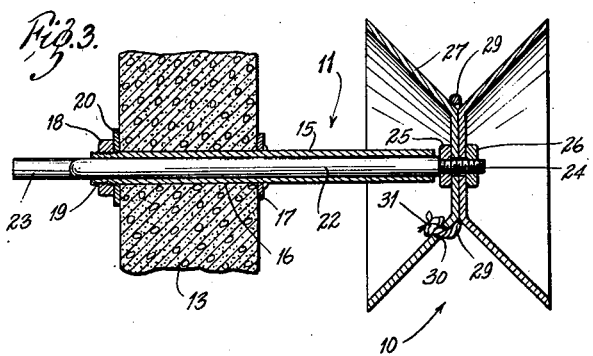
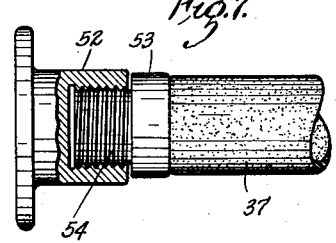
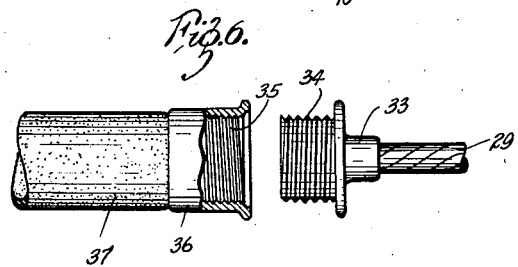
INVENTOR:
ROLAND D. KILLEBREW,
By Lawrence C. Kingsland
ATTORNEY.

Patented Jan. 6, 1942

2,268,877

UNITED STATES PATENT OFFICE 2,268,877

HOSE REEL

Roland D. Killebrew, St. Louis, Mo.

Application August 10, 1939, Serial No. 289,379

1 Claim. (Cl. 242—86)

The present invention relates generally to mechanisms for reeling garden hose and the like, and more particularly to a device of a construction to reel a hose into a building and to permit unreeling therefrom.

An object of the present invention is to provide a novel hose reeling mechanism.

Another object is to provide a novel hose reeling mechanism of a construction to reel a hose from an external disposition to within an enclosure.

Another object is to provide a hose reeling mechanism whereby a hose normally used to water a lawn, garden, or the like, may be quickly reeled to a position within the basement of a home.

Another object of the invention is to provide a novel hose reeling mechanism which is susceptible of economical manufacture, ready installation, and easy manipulation.

Other objects and advantages will be apparent from the following description, taken in conjunction with the accompanying drawing, in which:

Fig. 1 is a section through the wall of an enclosure showing a preferred embodiment of the present invention operatively installed;

Fig. 2 is a section similar to Fig. 1 showing a hose fully wound on the hose reeling mechanism;

Fig. 3 is a section on the line 3—3 of Fig. 1;

Fig. 4 is a section on the line 4—4 of Fig. 2, the reel being omitted for clarity;

Fig. 5 is a section on the line 5—5 of Fig. 2, the reel being omitted for clarity;

Fig. 6 is an enlarged view of a preferred coupling connection and the spigot end of a hose; and, Fig. 7 is an enlarged view of a stop member operatively connected to a hose.

Referring to the drawing more particularly by reference numerals, 10 indicates generally a hose reeling mechanism constructed in accordance with the concepts of the present invention. The reeling mechanism 10 includes a reel construction 11 and a guide construction 12 which are mounted in a wall 13.

The reel construction 11 includes an elongated sleeve 15 fixed in an aperture 16 in a wall 13 by a washer 17, welded or otherwise connected to the sleeve 15 intermediately thereof, and a nut 18 engaging threads 19 on one end of the sleeve 15 and bearing against a washer 20 (Fig. 3). A crank shaft 22 has bearing in the sleeve 15 and includes a handle 23 at one end and a threaded reduced extension 24 at the other end. On the threaded extension 24 between the nuts 25 and 26 in fixed relation to the shaft 22 is a reel 27 which may be of any preferred cross-section, although the cross-section shown has been found highly efficient. A rope 29 extends through an aperture 30 in the reel 27, which has a knot 31 at one end to prevent release through the aperture 30, and a coupling member 33 (Fig. 6) at the other end for the reception of a spigot connecting member 36 of a hose 37. The member 33 includes external threads 34 to engage the internal threads 35 of the spigot connection 36 of the hose 37.

The guide construction 12 includes a sleeve 40 fixed in an aperture 41 in the wall 13 by means of a washer 42 connected by welding, or the like, to the sleeve 40 intermediately thereof, and a nut 43 engaging threads 44 on one end of the sleeve 40 forcing a washer 45 into engagement with the wall 13. A guide member 47, welded or otherwise fixed to the internally disposed end of the sleeve 40 (Fig. 1) includes a section 48 of trough configuration (Fig. 5) and spaced rings 49 and 50. The sleeve 40 and the rings 49 and 50 are of sufficiently large diameters to permit the passage of the coupling member 33, the coupling member 36, and the hose 37.

A stop plug 52 (Fig. 7) is provided for closing the sleeve 40 which is connectable with a connection 53 of the hose 37, having external threads 54 normally receiving a water play nozzle (not shown). The plug 52 is, of course, only employed when the nozzle is removed.

The several elements of the hose reeling mechanism 10 are constructed of suitable materials and may be of other configurations within the scope of the present invention.

Operation

A preferred installation of the present invention is shown in Fig. 1 of the drawing. The hose reeling mechanism 10 is mounted in the wall 13 in close association with a water spigot 51 in order to reduce to a minimum the amount of work involved in reeling and unreeling the hose 37. The details of installation are obvious from the foregoing description and require no repetition here.

The rope 29 (Fig. 1) is extended through the sleeve 40 and the rings 49 and 50 so that the coupling member 33 is disposed externally of the enclosure, of which the wall 13 defines a part. For present purposes, the wall 13 may be assumed as part of the construction defining the basement of a house within which is disposed the reel 27. Assuming that the hose 37 has been used and is ready for storage, the coupling member 36 thereof is threaded onto the coupling member 33 secured to the free end of the rope 29. The reel 27 is then rotated by means of the exteriorly disposed handle 23 to draw the hose 37 into the reeled disposition shown in Fig. 2 of the drawing.

On occasion when the hose 37 is not to be used for a period of time, the stop plug 52 is threaded onto that end of the hose 37 which normally carries the nozzle, and serves as a sealing member for the sleeve 40. When the hose 37 is used frequently, the nozzle, normally occupying one end thereof, will serve as a stop for the hose and will extend from the wall 13 so that the hose 37 can be readily unreeled for immediate use. For winter storage, the hose 37 may be completely drawn through the guide construction 12 onto the reel 27 and the sleeve 40 suitably plugged.

It is to be understood that the foregoing description and accompanying drawing have been given by way of illustration and example, and not for purposes of limitation, the invention being limited only by the claim which follows.

What is claimed is:

A hose reeling mechanism comprising a shaft rotatably mounted in the wall of an enclosure, a reel fixed to one end of the shaft interiorly of the enclosure to turn therewith as a unit, a handle forming part of the shaft disposed exteriorly of the enclosure, a sleeve mounted in the wall of the enclosure and spaced from the shaft, a guide member connected to the sleeve and disposed interiorly of the enclosure, said guide member being curved to direct a hose to the reel and including means adapted to prevent the dislocation of a hose therefrom, and means connected to the reel adapted to be connected to the end of a hose, said sleeve and guide member permitting the passage therethrough of a hose and the said means.

ROLAND D. KILLEBREW.